July 21, 1931.  B. M. SHIPLEY  1,815,335
CASH REGISTER
Original Filed Jan. 19, 1924   4 Sheets-Sheet 1

Inventor
Bernis M. Shipley
By Carl Beust
Henry C. Stauffer
His Attorneys July 21, 1931. B. M. SHIPLEY 1,815,335
CASH REGISTER
Original Filed Jan. 19, 1924  4 Sheets-Sheet 2

Inventor
Bernis M. Shipley
By
His Attorneys

July 21, 1931. B. M. SHIPLEY 1,815,335
CASH REGISTER
Original Filed Jan. 19, 1924 4 Sheets-Sheet 4

Inventor
Bernis M. Shipley
By
His Attorneys

Patented July 21, 1931

1,815,335

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Original application filed January 19, 1924, Serial No. 687,305. Divided and this application filed April 9, 1927. Serial No. 182,370.

This invention relates to cash registers and the like machines, and has more particular reference to clerks' special counters for such machines.

The invention is shown applied to a machine of the type illustrated and described in applications for Letters Patent of the United States, Serial Number 608,281 filed on December 21, 1922, and Serial Number 687,305 filed on January 19, 1924 by B. M. Shipley. The subject matter of the present application is a division of the last mentioned application.

The machine to which the present invention is shown applied is provided with a plurality of clerks' keys and it is one of the objects of this invention to provide an individual counter for each of the clerks' keys to count the number of transactions registered by the clerks.

Another object is to provide mechanism for controlling the operation of the clerks' counters so that the selected counter will be actuated to advance one step on each single item transaction and on the second cycle of the total-taking operation of a multiple item transaction.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

General description

The machine to which the present invention is shown applied, as illustrated and described in the applications cited, consists, in general, of a plurality of manipulative keys for entering the amounts to be registered, indicating mechanism for indicating the amounts registered and the total thereof, a plurality of totalizers for accumulating the various items and transactions, and printing means controlled so as to issue a receipt upon which is printed either a single item or a plurality of items, together with the total thereof. A bank of transaction keys, a bank of clerks' keys and a total-taking lever are provided for controlling the various elements of the machine, all of which is fully shown and clearly described in the above mentioned Shipley applications and to which reference may be had for a complete understanding of the machine.

The machine to which the present invention is shown applied is adapted for use in places of business where it is desirable to register transactions comprising a single item and transactions comprising a plurality of items with the total thereof, and where it is desired to count the number of single item transactions, the number of items of a multiple item transaction, and the number of multiple item transactions entered into the machine; also where it is desirable to count the number of transactions entered into the machine by each individual clerk.

Keyboard

The keyboard of the present machine is the same as that shown and described in the above mentioned applications, but more particularly the parent case, Serial No. 687,305, to which reference is hereby made for a full and clear description thereof. Only a brief description of the keyboard will be given herein.

Figures 11, 12, 13, 14:
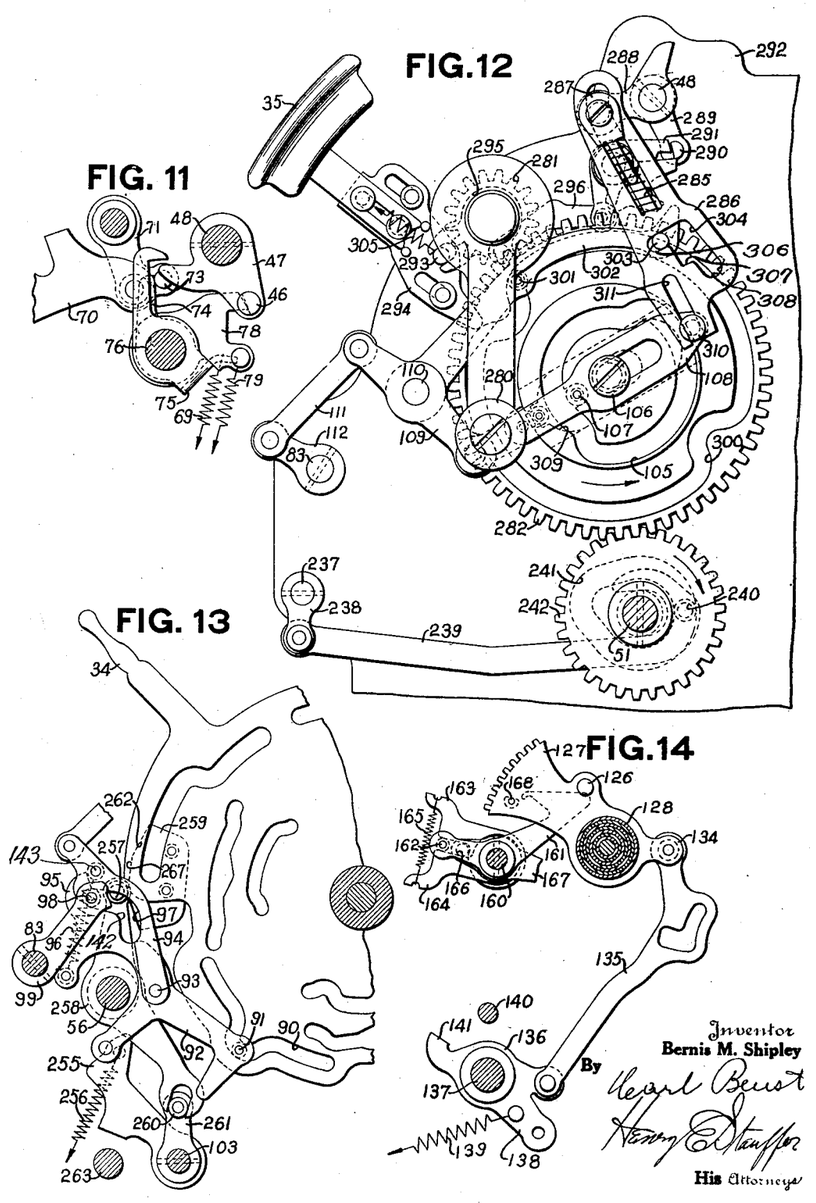
Fig. 11 shows a part of the release trip mechanism.
Fig. 12 is an elevation of the right hand end of the machine showing a part of the operating mechanism.
Fig. 13 shows the total lever and a part of the mechanism adjusted thereby.
Fig. 14 is a detail view of a part of the clerks' key releasing mechanism.

The keyboard disclosed in the parent case comprises a plurality of banks of amount keys, not shown herein, a bank of clerks' keys 30 (Fig. 3), a bank of transaction keys 31 and 32 (Fig. 1), a key 33 for releasing the depressed transaction key, a total lever 34 (Fig. 13) for controlling the machine on total-taking and sub-total-taking operations, and a starting bar 35 (Fig. 12).

Transaction keys.

The transaction keys 31 and 32 (Fig. 1) and the transaction key release key 33 are mounted in a common frame 36, supported in the machine by cross rods 37 and 38. Keys 31 are used in entering transactions consisting of two or more items and compel the totals thereof to be printed. This is known herein as a multiple item transaction. The keys 32 are used in entering transactions comprising a single item, known herein as a single item transaction.

Figure 1:
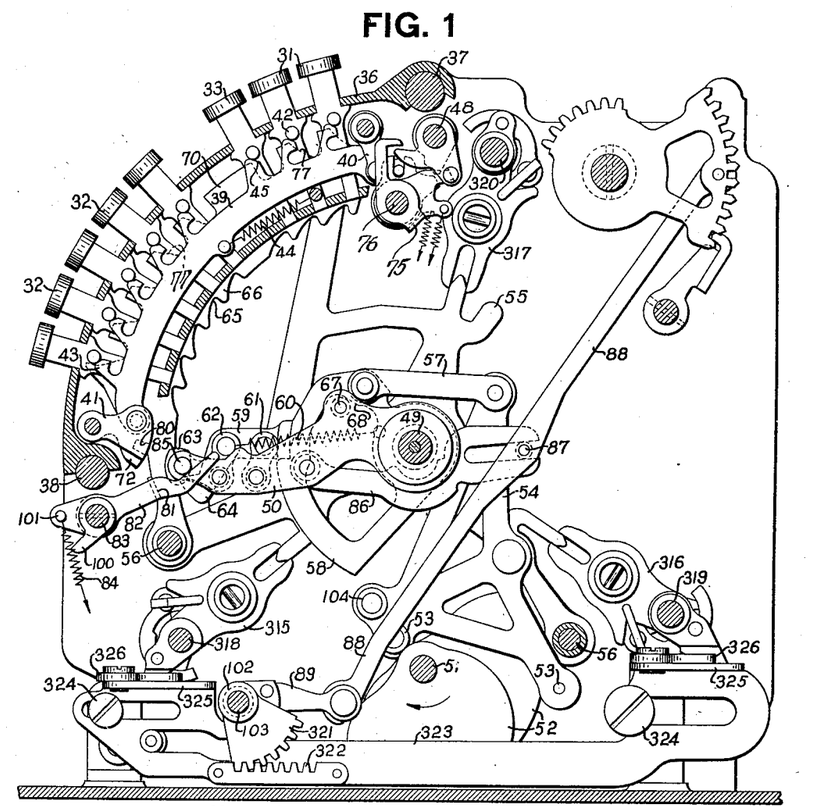
Fig. 1 is a section through the machine taken at the right of the bank of transaction keys.

The keys 31 and 32 are held in their normal positions by springs, not shown, and are held in their depressed positions by a locking detent 39, supported at its upper end by an arm 40 and at its lower end by an arm 41. Each of the keys 31 and 32 has a pin 42 mounted therein, which co-operates with a hook 43 on the detent 39 to hold the key depressed. After the key 31 or 32 has been depressed, the detent 39 is returned to its normal position by a spring 44, at which time the hook 43 engages the pin 42 and retains the key in its depressed position.

The transaction keys 31 and 32 are not released automatically during an operation of the machine, as are the clerks' keys and the amount keys. Keys 31 and 32 can be released only by depressing another one of the transaction keys 31 or 32, or by depressing the transaction key release key 33. This key is provided with a pin 42, which co-operates with an angular lug 45 on the detent 39 to move the detent down and release the depressed transaction key. There is no hook 43 opposite the key pin 42 of the transaction key release key 33, and therefor, this key will return immediately to its outward or normal position.

Transaction differential mechanism

Associated with the bank of transaction keys is a differential mechanism (Fig. 1) provided for the purpose of adjusting the printing and indicating mechanisms, selecting transaction special counters, and controlling the various elements of the machine for registering single item and multiple item transactions.

This differential mechanism includes a differentially movable arm 50 (Fig. 1), given a variable movement on each operation of the machine. Pinned to the shaft 51, which is the main drive shaft of the machine, is a pair of cams 52, co-operating with two rollers 53 carried by a Y-shaped lever 54. The lever 54 is pivoted on an irregularly shaped support plate or hanger 55, supported in the machine by two rods 56. At its upper end the lever 54 is connected by a link 57 to a driving segment 58, pivotally mounted on a stud 49, carried by the hanger 55. The cams 52 receive one clockwise rotation on each operation of the machine, which, through the mechanism just described, rocks the segment 58 first clockwise and then counter-clockwise to its normal position. The segment 58 receives this invariable excursion on each operation of the machine. The arm 50 is connected to the segment 58 by a latch 59, the foot of which engages a shoulder on the segment 58, and is held in this position by a spring 60.

The latch 59 (Fig. 1) is supported on the arm 50 by an arm 61 and a bell crank 62. As the segment 58 is moved up, the arm 50 is carried with it until an end 63 of the bell crank 62 strikes the end of a depressed key and is rocked counter-clockwise, disengaging the foot of the latch 59 from the shoulder on the segment 58 and engaging a nose 64 on the latch with a notch 65 formed in a plate 66, supported by one of the rods 56 and the upper end of the hanger 55. The segment 58 continues its regular excursion and on its return movement, as the shoulder thereon arrives opposite the foot of the latch 59, the spring 60 will act to disengage the nose 64 from the plate 66 and reengage the latch with the segment 58. At this time a stud 67 mounted in the arm 50 is engaged by a surface 68 on the segment 58 which returns the arm 50 to its normal position.

A beam 86 is associated with the differential mechanism for differentially adjusting the printing mechanism, selecting totalizers, and controlling the various elements of the machine. The beam 86 is pivoted on the arm 50 and at its right hand end is bifurcated to cooperate with a pin 87 in a link 88. At is lower end the link 88 is connected to an arm 89 secured to one end of a sleeve 102 surrounding a rod 103. A roller 104 is mounted on the Y-shaped lever 54 to adjust the beam as is old and well known in the art.

The key pins 42 of the transaction keys 31 and 32 (Fig. 1) also engage a setting bar 70, which operates an interlock between the transaction keys and the starting bar. The bar 70 is supported at its upper end on an arm 71 (Fig. 11) and at its lower end on an arm 72 (Fig. 1). Mounted on the arm 71 is a pin 73 which engages an upwardly extending arm 74 of a yoke 75 pivoted on the shaft 76. As a transaction key 31 or 32 is depressed, the key pin 42 (Fig. 1) will engage an inclined wall 77 of the setting bar 70 and rock the bar to the left, to rock the yoke counter-clockwise (Fig. 11). The arm 74 is maintained in engagement with the pin 73 by a spring 69. As the yoke 75 rocks counter-clockwise it carries with it the releasing pawl 78, pivoted on the shaft 76 and held in engagement with the yoke 75 by a spring 79. The pawl 78 has a projection which normally lies in the path of a flattened stud 46 mounted in an arm 47, pinned to a machine releasing shaft 48 adapted to be rocked clockwise, as will be later described, when the starting bar 35 is depressed. An interlock is thereby formed between the transaction keys 31 and 32 and the starting bar 35, so that if the starting bar is operated without depressing a transaction key, the machine will not be released for operation. If, however, the transaction key is depressed in its proper sequence, the projection on the pawl 78 will be out of the path of the stud 46 when the starting bar 35 is operated to release the machine, as will be hereinafter described.

In entering a "multiple item" transaction, the operated key 31 should be locked in depressed position, and all other transaction keys locked against depression, until the completion of the entire transaction.

This result may be conveniently obtained by arranging the inclined walls of those recesses in the setting bar 70 which lies beneath the "multiple item" keys 31, so that upon depression of a "multiple item" key 31, the setting bar 70 is given a greater extent of movement than is imparted to it by the "single-item" keys 32, and by providing the arm 72 to which the lower end of the setting bar 70 is pivoted, with a notch 80, engageable by a locking bail 81 journaled on a shaft 83.

When a "single-item" key 32 is depressed, the setting bar 70 is not shifted a sufficient distance to swing the notched arm 72 far enough to bring the notch 80 into the path of the locking bail 81. But, owing to the longer incline of the walls 77 of the notches in the setting bar 70, beneath the "multiple-item" keys 31, depression of a "multiple-item" key will shift the setting bar 70 and its arm 72 to such an extent that, upon complete depression of the key and the restoration of the detent 39, and its arm 41 to locking position, the notch 80 in the arm 72 is located in the path of the locking bail 81, preparatory to the entry of the edge of the locking bail 81 thereinto.

An arm 82 pivoted on the shaft 83 is fast with the locking bail 81 to control the latter. The inner free end of the bail arm 82 extends inwardly into the path of a stud 85 projecting from the usual differentially movable arm 50, which stud normally maintains the bail arm 82 and the locking bail 81 in idle position against the tension of a spring 84 connected with a stud 101 on the arm 82, which tends to rock the arm 82 and locking bail 81 counter-clockwise toward the arm 72.

Depression of an item key, and amount keys, followed by an operation of the machine, rocks the differential arm 50 clockwise, in the well known manner, to select the proper totalizer, and in so doing, the differential arm 50 releases the bail arm 82 to the action of the spring 84, which rocks the arm 82 and its locking bail 81 counter-clockwise, to enter the bail 81 in the notch 80 and hold the depressed "multiple item" key 31 in its depressed position throughout two or more operations of the machine.

The extent of travel permitted the locking bail 81 when it enters the notch 80, positions the bail beneath the arm 41, and thereby locks all of the keys in the transaction bank against depression.

When a "single-item" key 32 is depressed, and the machine is operated, the limited travel permitted the locking bail 81 is such that the free end of the bail arm 82 remains in the path of the stud 85 when the bail contacts the unnotched end of the arm 72 so that upon the return of the differential arm 50 at the end of the operation, the stud 85 contacts the bail arm 82 and restores it, together with the bail 81, to idle position (as shown in Fig. 1). But when a "multiple item" key 31 is depressed, and the machine is operated, the extent of travel of the bail 81 withdraws the free end of the arm 82 from the path of the stud 85 on the differential arm 50.

Therefore, to effect the release of the depressed "multiple-item" key 31, and the restoration of the locking bail 81 to its idle position, the total lever 34 (Fig. 13) is provided with a cam slot 90. After all the items of a "multiple-item" transaction have been entered in the machine, the total lever 34 is manually shifted from its normal "add" position to the "item total" position, and after the total is printed, the total lever is restored to its normal "add" position. A roller 91 carried on one arm of an intermediate lever 92 pivoted at 93, enters the cam slot 90 in the total lever, the opposite arm 95 of the lever 92 having formed on one edge thereof a cam recess 142. A link 94 also pivoted at 93 and overlying the arm 95 of the lever 92, has a complementary cam recess 97 formed in its edge, which co-operates with the cam recess 103 to constitute a cam slot. A spring 96 connects a stud 143, on the link 94, with the arm 95 of the lever 92 to hold these parts together, with the stud 143 in contact with the upper end of the arm 95. This arrangement provides a flexible cam mechanism which will yield to prevent injury to the machine in case the shaft 83 is locked by a depressed key, at the time the total lever 34 is shifted from its "add" position. A crank 99, fast on the shaft 83, on which the bail carrying arm 82 is pivoted, carries a roller 98 entered in the cam slot formed by the complementary recesses 103 and 97 of the arm 95 and the lever 92 respectively.

When the total lever 34 is adjusted from its "add" position to its "item total" position, its cam slot 90 rocks the lever 92 in a counter-clockwise direction, and the arm 95, together with the link 94, rocks the crank 99 and shaft 83 in a clockwise direction.

A tappet 100 (Fig. 1), fast on the shaft 83 is thereby rocked to contact a stud 101 on the bail arm 82.

As is customary in machines of the type to which this invention is applied, a total taking operation includes two cycles of rotation of the main drive shaft 51 of the machine, during the latter part of the first of which cycles, the shaft 83 is automatically given a second step of rotation in a clockwise direction (by means later described) which presses the tappet 100 against the stud 101 on the bail arm 82 to rock the bail arm 82 clockwise sufficiently to return the free end of the bail arm into the path of the stud 85 of the differential arm 50, while the latter is at a point some distance above the bail arm 82, so that as the differential arm 50 is restored, its stud 85 strikes the free end of the bail arm 82 and withdraws the locking bail 81 from the notch 80 in the arm 72 to permit the release of the depressed "multiple item" key 31.

Mechanism will now be described for giving the shaft 83 the second clockwise movement mentioned above. This mechanism comprises the cam 105 (Fig. 12) freely mounted on a stud 106 supported by the side frame of the machine and adapted to co-operate with a roller 107 mounted in a pitman 108. The roller 107 is normally held in a notch in the groove 105 and is withdrawn from its ineffective position, in the notch, into an effective position in the cam groove by the above described movement of the total lever 34. The pitman 108 is guided on the stud 106, and at its left hand end is pivoted to one arm of a lever 109, pivoted on a stud 110, supported by the side frame of the machine. The opposite arm of the lever 109 is connected by a link 111 to an arm 112 pinned to the shaft 83. The cam 105 receives one counter-clockwise rotation on total taking operations which moves the pitman 108 first to the left and rocks the lever 109 clockwise, and through the link 111 and arm 112, rocks the shaft 83 slightly clockwise to return the free end of the bail arm 82 into the path of the stud 85 on the differential arm, as above described. The pitman is then restored to the position to which it was moved by the total-taking lever 34, as described above.

*Clerks' keys*

The present machine is provided with four clerks' keys 30 (Figs. 3 and 4) mounted in a frame 115 (Fig. 4) supported by the rod 37 and a rod 116 near the left hand side of the machine. The keys 30 when depressed are so retained by means of a detent 117 slidably mounted on two screw studs 118, and the detent is moved toward the right when one of the keys is depressed. The detent 117 is spring urged toward the left and after the key has been depressed, a shoulder 119 engages a pin 120 mounted in the key. The depressed clerk's key is returned to its normal position by a spring, not shown, near the end of a single item operation and near the end of the second cycle of a total-taking operation. The detent 117 is moved to release the key by a bell crank 121 (Fig. 4), one arm 122 of which is adapted to engage a pin 123 on the detent. The bell crank is pivoted on a stud mounted in the frame 115 and is held in its normal position by a spring 124. The other arm 125 of the bell crank is adapted to be engaged by the pin 126 carried by a segment gear 127 pivoted on a sleeve 128. As the segment gear moves clockwise, the pin 126 strikes the arm 125 and moves it in a counter-clockwise direction. As the pin 126 passes off the arm, the bell crank will be returned to its normal position by the spring 124. When the segment gear 127 is moved counter-clockwise to its normal position, the pin 126 will strike the rear end of the arm 125 of the bell crank, thereby rocking the arm 122 clockwise to engage the pin 123, thus moving the detent 117 to the right. This movement of the detent disengages the shoulder 119 from the pin 120, permitting the depressed key to be returned to its normal position. When the pin 126 passes off the arm 125, the spring 124 again returns said arm to its normal position.

Mechanism is provided to compel the depression of a clerk's key before the machine can be released for operation. Pinned to the shaft 48 is an arm 130 (Fig. 4) normally contacting the underside of a pin 131 carried by a releasing bar 132, slidably mounted on the screw studs 118 and retained in its normal position by a spring 129. As a clerk's key is depressed the pin 120 will engage an inclined edge 133 of the releasing bar 132 and move the bar toward the left to withdraw the pin 131 from the path of the arm 130. The shaft 48 is then free to be rocked, as will hereinafter be described, to release the machine for operation.

The gear segment 127 has a rearwardly extending arm 134 (Fig. 4), connected by a link 135 to a lever 136 (Fig. 14), pivoted on a stud 137, projecting from the printer frame, not shown. The lever 136 has a downwardly extending arm 138 to which is attached a spring 139. This spring through the lever 136 and link 135, imparts to the gear segment 127 its clockwise movement. The clockwise movement of the lever 136 and consequently the clockwise movement of the segment 127 is limited by a stud 140 mounted in the printer frame, not shown, in the path of an arm 141 on the lever 136.

Mechanism will now be described for restoring the gear segment 127 to its normal position. A pair of cams 145 (Fig. 8) pinned to a shaft 146 co-operates with two rollers 147 carried by the forked arm of a lever 148 pivoted on a stud 149 supported by the side frame of the machine. At its upper end the lever 148 is pivoted to a slide 150 which is guided by a stud 151 mounted in the printer frame. At its left hand end the slide 150 is adapted to engage the pin 126 carried by the segment 127. The cams 145 receive one clockwise rotation on each operation of the machine, which moves the slide 150 first to the right and then to the left to restore the segment 127 to its normal position.

Figure 8:
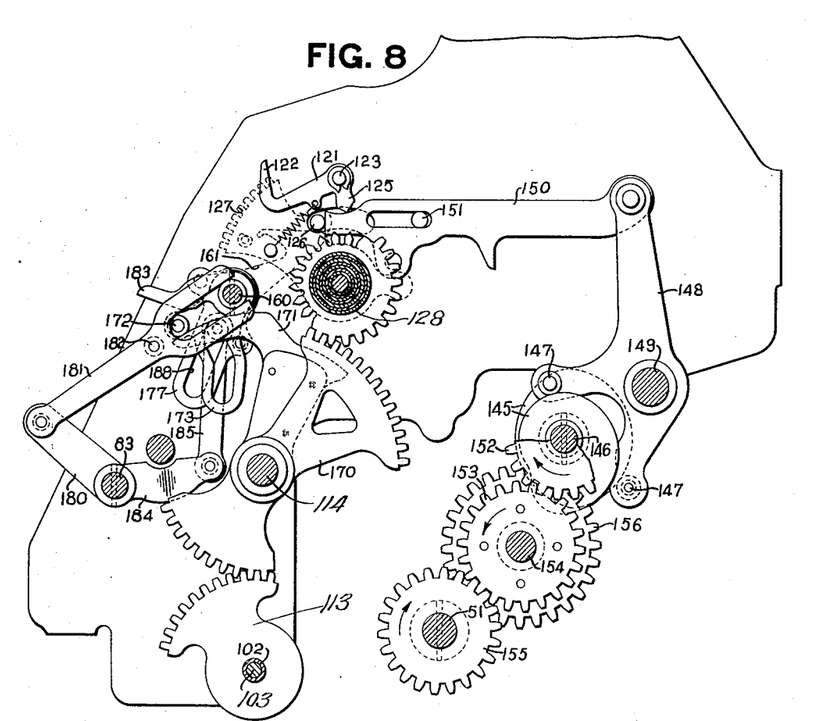
Fig. 8 shows the mechanism for releasing and controlling the release of the clerks' keys.

The shaft 146 is driven by a gear 152 pinned thereon, meshing with a gear 153, journaled on a stud 154. The gear 153 meshes with a gear 155 pinned to the shaft 51, which is the main drive shaft of the machine. A gear 156 pinned to the gear 153 is used only when the machine is operated by an electric motor.

The gear teeth on the segment 127 (Figs. 4, 8, 9, 10 and 14) are not used in the present invention, but it is thought that a brief description of their use as illustrated and described in the above mentioned co-pending applications will be helpful. This segment is adapted to receive a long and a short oscillation to impart to the issuing receipt a long feed and a short feed. The length of the feed is governed according to the character of the transaction. The movement of the feeding mechanism on a single item transaction is equal to the greater movement of the segment 127. When an item of a multiple item transaction is entered, the feeding mechanism will move a distance equal to the shorter movement of the segment 127.

It is therefore to be understood that when an individual item of a multiple item transaction is entered into the machine it is not desired that the clerk's key should be released. A description of the mechanism for controlling the release of the clerks' keys will now be given.

Pivoted on a shaft 160 is an arm 161 (Figs. 8, 9, 10 and 14) which is operated by a flexible drive member on account of the overlapping of time in the operation of the segment 127 and the arm 161. Projecting laterally from the arm 161 is a pin 162 projecting between two arms 163 and 164 (Fig. 14) held in contact with the pin by a spring 165 stretched between the arms. These arms are driven by a pin 166 carried by a lever 167 which is pinned to the shaft 160. When the arm 161 is moved counter-clockwise to the position shown in Fig. 9 the hook portion of the arm will be in the path of the flattened stud 168 carried by the segment 127. With the arm 161 in this position, the segment 127 will be limited to a shorter movement. The arm 161 is placed in this position by mechanism controlled from the transaction keys.

Figures 9, 10:
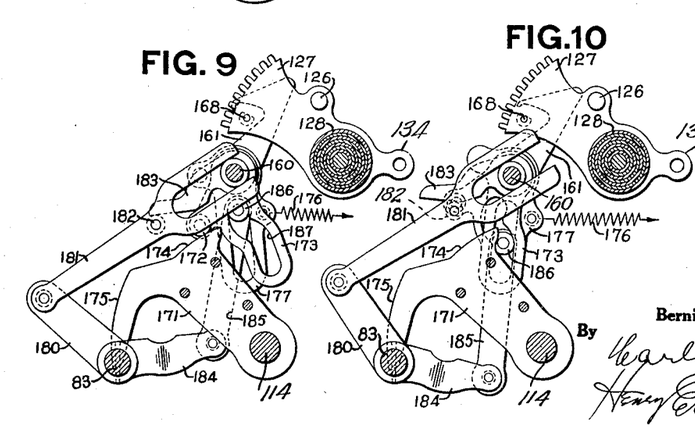
Fig. 9 is a detail view of the mechanism for releasing the clerks' keys, shown in position for entering a multiple item transaction.
Fig. 10 is the mechanism shown in Fig. 9 when the total-taking lever is in the item total position.

Secured to a segment lever 170 (Fig. 8) is a cam arm 171. The cam arm 171 is adjusted under control of the transaction keys 31 and 32, which control the differential positioning of the link 88 (Fig. 1), arm 89, and sleeve 102, in the manner before described. Fast to the sleeve 102 is a segment 113 (Fig. 8) meshing with the lower teeth of the segment 170 loose on the stud 114, to which the cam arm 171 is also secured. The outer edge of the cam arm 171 contacts a roller 172 carried by an arm 173 loose on the shaft 160, (Figs. 8, 9 and 10). This cam arm 171 has a low edge 174 and a high edge 175. In single item transactions the high edge 175 (Fig. 8), of the cam arm is in contact with the roller 172, with the arm 161 in its ineffective position in relation to the flattened stud 168. With the arm 161 in this position, the depressed clerk's key will be released on each single item transaction operation. In a multiple item transaction operation the cam arm 171 is given a counter-clockwise movement sufficient to bring the low edge 174 of the cam arm 171 opposite the roller (Fig. 9 and 10), whereupon a spring 176, stretched between an arm 177 pinned to the shaft 160 and a pin projecting from the printer frame, will rock the arm 161 counter-clockwise into the path of the flattened stud 168. In this position the arm 161 will limit the clockwise movement of the segment 127. This limited movement of the segment is not sufficient to carry the pin 126 past the arm 125 of the bell crank 121, for which reason the arm 122 will not receive a clockwise movement and the clerk's key will not be released when the items of a multiple item transaction are entered.

After the last item of a multiple item transaction has been entered, the total-taking lever 34 (Fig. 13) is moved to the item total position, which imparts an initial movement to the shaft 83, as previously described.

Secured to the shaft 83 is an arm 180 (Figs. 8, 9, and 10) connected to one end of a pitman 181, which at its opposite end is bifurcated to slide upon the shaft 160. The pitman 181 carries a roller 182 which engages an arm 183, pinned to the shaft 160. The initial clockwise movement of the shaft 83 will, through the means just described, rock the arm 183, shaft 160 and arm 161 clockwise to the positions shown in Fig. 10.

As the initial movement of the shaft 83 is not sufficient to move the roller 172 out of the path of the high edge 175 of the cam arm 171, which is moved by the differential mechanism of the transaction bank on each cycle of operation, it is necessary to provide means for giving the roller 172 additional movement. An arm 184 (Figs. 8, 9 and 10) pinned to the shaft 83 is connected to one end of a link 185, which at its opposite end carries a roller 186 engaging a slot 187 in the arm 173, loose on the shaft 160 and a slot 188 in the arm 177 pinned to the shaft 160. As the shaft 83 is given its initial movement the roller 186 moves downwardly in the slots 187 and 188 (Fig. 8) causing the arm 173 to move clockwise, to a position in which the roller 172 is clear of the cam arm 171, (Fig. 10). When the shaft 83 receives the additional movement hereinbefore described, the roller 186 continues its downward movement in the slots 187 and 188 without imparting additional movement to the arms 173 and 177, the lower parts of the slots being parallel each with the other. This additional movement of the shaft 83 imparts additional movement to the arm 183 through the roller 182, which gives additional clockwise movement to the hooked arm 161, placing it in its ineffective position. With the hooked arm 161 in its ineffective position, the segment 127 will be permitted its full length of movement during the second cycle of a total-taking operation, which will position the pin 126 to the right of the arm 125 of the bell crank 121. When the segment 127 is returned to its normal position, the arm 122 and the detent 117 will be moved to release the depressed clerk's key.

*Clerk's key counter*

A counter 178 is provided for each clerk's key 30, (Figs. 3 and 4) to count the number of transactions registered by each clerk. The counters are of the usual step-by-step type and are mounted in a frame 179 located to the right of the clerk's key frame 115. These counters are operated during a single item transaction and during the second cycle of a total-taking operation of a multiple item transaction.

For the purpose of selecting the counters 178 for actuation each key 30 is provided with a pin 189 (Figs. 3 and 4) engaging an elongated opening in a link 190, which is connected by a pin 191 to an operating link 192, for actuating the counter this operating link being connected to an arm 193, freely mounted upon the counter shaft 194. The arm 193 carries a differentially tined pawl 195, which engages ratchet wheels 196 to operate the counter in the usual way. Spring actuated retaining pawls 197 prevents retrograde movement of the counter wheels. The pins 191 engage slots 198 formed in a reciprocating driver 199 common to all the counters, pivoted at its upper end on an arm 200 and at its lower end on an arm 201. The arms 200 and 201 are pivoted on the frame 179. A sliding counter-selecting bar 211 (Fig. 3) is provided with projections 212, 213, 214 and 215 which provide obstructions co-operating with the lower ends of the connecting links 190, actuated by the keys, to enable the reciprocating driver 199, through the selected operating link 192, to operate the tined carrying pawl 195 of the counter corresponding to the key depressed. The selecting bar 211 is guided in its sliding movement on two screw studs 216, which engage slots formed therein. The lower key 30 (Fig. 3) is shown depressed with its connecting link 190 moved into engagement with the obstruction 212. As the driver 199 moves toward the left the operating link 192 is forced toward the left, which causes the tined carrying pawl 195 to move the ratchet wheels 196 one step of movement. The selecting bar 211 is connected at its lower end by a stud 217 to an arm 218, pinned to the shaft 160. The arm 218 is secured by a rivet 219 to the arm 177, which is oscillated to adjust the selecting bar 211 by mechanism under control of the transaction keys, as previously described.

Figures 3, 4, 5, 6, 7:
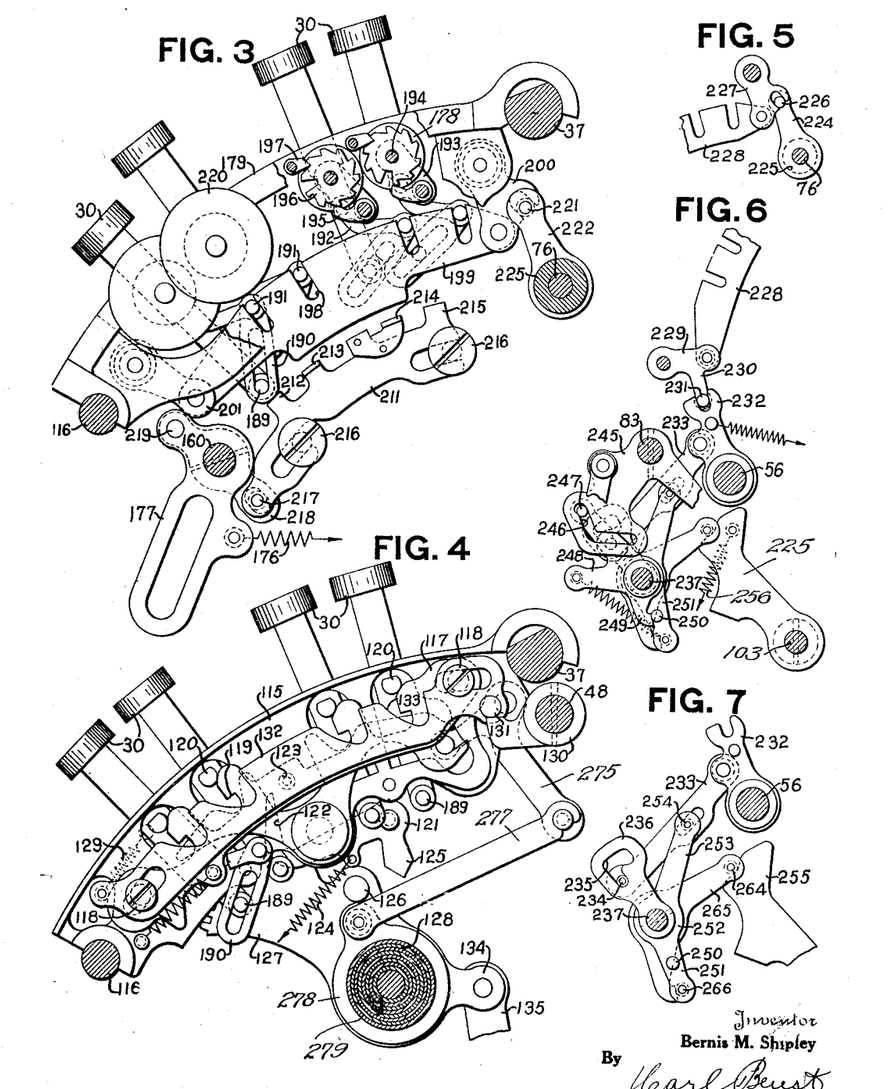
Fig. 3 is an enlarged view of the clerks' counters.
Fig. 4 shows an enlarged view of the bank of clerks' keys.
Figs. 5 and 6 are detail views of a part of the driving mechanism for the clerks' counters.
Fig. 7 is a detail view of a part of the disabling mechanism for the driving mechanism for the clerks' counters.

In a transaction involving two or more items, the bar 211 is moved toward the right to an ineffective position during the first item entering operation and is returned to its effective position as shown in Fig. 3 during the second cycle of a total-taking operation, all of which will hereinafter be described. The clerks' counter may be reset to zero at any time, by manually turning the usual disc 220, secured to the counter shaft 194, all of which is old and well known in the art.

Mechanism will now be described for giving the driver 199 its reciprocating movement. The arm 200 (Fig. 3), which supports the driver 199 at its upper end has a slot formed therein which co-operates with a pin 221 mounted in an arm 222, free on the shaft 76. The arm 222 is rigidly connected to an arm 224 (Fig. 5) by means of a hub 225. The arm 224 has a pin 226 mounted therein, which co-operates with a slot formed in an arm 227, similar to the arm 200, which supports one end of the driver 199. The arm 227 supports the upper end of an operating bar 228, which at its lower end is supported by an arm 229, (Fig. 6). The arm 229 has a downwardly extending finger 230 upon which is mounted a pin 231, co-operating with a slot formed in the end of an arm 232 supported on the front rod 56. It can be clearly seen that a counter-clockwise movement of the arm 232 will through the mechanism just described, rock the arm 200 clockwise and move the driver 199 to the left. Pivoted to the arm 232 (Figs. 6 and 7) is a link 233, which at its opposite end carries a pin 234 projecting into a right angle opening 235 formed in the arm 236, pinned to a shaft 237. At its opposite end the shaft 237 has pinned thereto an arm 238 (Fig. 12) to which is pivoted a pitman 239 adapted at its right hand end to slide on the shaft 51. The pitman 239 carries a roller 240 projecting into a cam groove 241 formed in the side of a gear 242 pinned to the shaft 51. It will be remembered that the shaft 51 is the main drive shaft of the machine and receives one clockwise rotation on each cycle of operation. The cam groove 241 is so shaped as to give the pitman 239 a movement first to the right and then back to its normal position, which through the arm 238 will rock the shaft 237 first counter-clockwise and then clockwise to normal. This rocking movement of the shaft 237 will through the arm 236 (Figs. 6 and 7) and link 233 give the arm 232 its rocking movement described above.

As it is desired to advance the clerk's counter one step on each single item transaction, and one step on each multiple item transaction only, it is necessary to provide means for disabling the clerks' counter operating mechanism when registering the items of a multiple item transaction and on certain total-taking operations. This disabling mechanism will now be described.

It will be recalled that the cam arm 171 (Figs. 8, 9 and 10) is differentially positioned under the influence of the transaction keys 31 and 32. The high edge 175 of the cam arm 171 is positioned in contact with the roller 172 carried by the arm 177 when single items are being entered into the machine. When the items of a multiple item transaction are being entered, the low edge 174 of the cam arm 171 is opposite the roller 172. As shown in Figs. 3 and 8, these parts are in position for a single item entering operation. When, however, a multiple item key is depressed and the cam arm 171 is rocked counter-clockwise to the position shown in Fig. 9, the spring 176 will rock the arm 177 counter-clockwise. This counter-clockwise movement of the arm 177 will, through the arm 218 (Fig. 3) move the counter selecting bar 211 to the right, moving the projections 212, 213, 214 and 215 from their effective positions opposite the key actuated connecting links 190. With the selecting bar 211 in this position, the connecting links 190 will be slid idly over the pins 189 when the driver 199 is moved to the left. Likewise the pins 191 will slide idly toward the bottom of the slots 198 and the link 192 will not be operated to advance the selected clerk's counter.

It will be recalled that when the machine is operated with a multiple item key depressed, the cam arm 171 (Fig. 9) is adjusted to the position shown in Fig. 9. This positions the low edge 174 on the cam arm beneath the roller 172 on the arm 173, which permits the spring 176 to rock the arm 173 and the arm 177 counter-clockwise about the shaft 160, which through the arm 218, will move the selecting bar 211 (Fig. 3) to the right. After the last item of a multiple item transaction has been entered in the machine, the total lever 34 (Fig. 13) is adjusted to the item total position. This movement of the total lever 34, it will be recalled, gives the shaft 83 an initial clockwise movement. This movement of the shaft 83 rocks the shaft 160 and consequently the arm 177 clockwise, as described above, to move the selecting bar 211 to the left to its effective position. It is, however, desirable to disable the operation of the clerk's counter on the first cycle of an item total-taking operation. The following mechanism has been provided to accomplish this:

Pinned to the shaft 83 is an arm 245 (Fig. 6) having formed therein a slot 246 into which projects a pin 247 carried by one arm of a three-armed lever 248. The lever 248 is pivoted on the shaft 237 and has a downwardly extending arm 249 formed to engage a pin 250 carried on a downwardly extending arm 251, of the lever 252 also pivoted on the shaft 237. An upwardly extending arm 253 of the lever 252 carries a pin 254 projecting into a slot formed in the link 233 (Fig. 7). The shaft 83 is given an initial clockwise movement by the movement of the total lever 34. This movement of the shaft 83 will move the arm 245 counter-clockwise a distance sufficient to cause the cam slot 246 to rock the lever 248 counter-clockwise, which through the arm 249 and pin 250 will rock the lever 252 also counter-clockwise. The counter-clockwise movement of the lever 252 through the pin 254 will rock the link 233 clockwise about its pivot in the arm 232 a distance sufficient to position the pin 234 in the angle of the opening 235 in the arm 236. In this position the arm 232 will be ineffective to shift the driver 199 to the left, as described above. Just before the second cycle of a total-taking operation the shaft 83 is given a second clockwise movement as hereinbefore described. This second movement of the shaft 83 and the arm 245 through the cam slot 246 will rock the lever 248 clockwise to its normal position. At this time a spring stretched between one arm of the three-armed lever 248 and the downwardly extending arm 251 of the lever 252 will rock the lever 252 clockwise to restore the link 233 to its normal position thus moving the pin 234 into the lower part of the opening 235 in the lever 236. Therefore, on the second cycle of a total-taking operation the arm 236 is effective to operate the special counter as hereinbefore described.

It is not desired to advance the clerk's special counter when reading or resetting the totalizer selected under control of the transaction key 32. The mechanism will now be described for disabling the clerk's counter operating mechanism on such total-taking operations.

A cam arm 255 (Figs. 7 and 13) pinned to the shaft 103 near its left hand end, is constantly urged counter-clockwise by a spring 256. The cam arm 255 is retained in its normal position by a roller 257 carried on a lever 258, pivoted on the front rod 56, engaging a cam block 259 riveted on the total-taking lever 34. The lever 258 is bifurcated at its lower end to engage the pin 260 carried by an arm 261 pinned to the shaft 103 near its right hand end. When the total lever 34 is moved two steps counter-clockwise to prepare the machine for resetting the totalizer selected by one of the keys 32 an inclined edge 262 of the block 259 is brought opposite the roller 257 whereupon the cam arm 255 is rocked counter-clockwise under the influence of the spring 256. The counter-clockwise movement of the cam arm 255 will, through a pin 264 (Fig. 7) carried on the lever 265 rock the lever 265 counter-clockwise. A downwardly extending arm of the lever 265 engages a pin 266 mounted on the lever 252, previously described, and rocks this lever counter-clockwise, which in turn rocks the link 233 clockwise to remove the pin 234 from its effective position to its ineffective position in the opening 235 in the arm 236. The driver 199 will not be effected by the movement of the arm 236, as previously described. The movement of the total lever 34 (Fig. 13) to its "add" position will restore the parts just described, to their normal effective positions. With the total control lever 34 in its "add" position and when it is moved one step counter-clockwise to prepare the machine for resetting the multiple item totalizer the lever 258 is held in the position shown in Fig. 13 by a concentric surface 267 of the block 259. In this position the cam arm 255 is ineffective to disable the clerks' counter operating mechanism.

Figure 2:
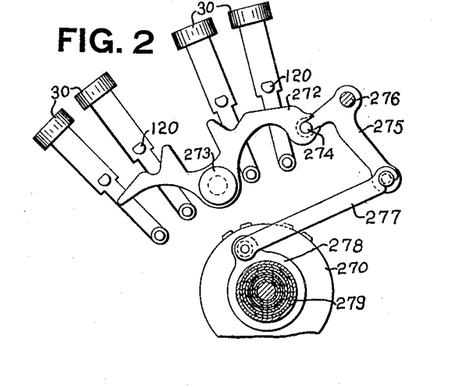
Fig. 2 shows the mechanism for adjusting the clerks' type wheel.

Depressing one of the clerks' keys 30 (Figs. 2 and 4) directly positions a type having characters corresponding to the clerks' keys by the following means. The pins 120 on the key shanks co-operate with a lever 272 (Fig. 2) to rock this lever clockwise and counter-clockwise according to the key depressed. This lever is pivoted on a stud 273 mounted in the key frame 115. One end of the lever 272 is bifurcated to engage a pin 274 carried by one arm of a bell crank lever 275 pivoted on a stud 276, supported in the key frame 115. The other arm of the bell crank lever is connected by a link 277 to an arm 278 secured to one end of a sleeve 279, to the other end of which is secured the clerks' type wheel 270.

Operating mechanism

The machine, as shown, is operated manually by the crank 280 (Fig. 12), connected to a gear 281, meshing with a gear 282, which in turn meshes with the gear 242 pinned to the main drive shaft 51, previously described. The ratio of the gears is such that two clockwise rotations of the crank 280 and gear 281 will give one-half of one counter-clockwise rotation to the gear 282 and one clockwise rotation to the gear 242 on the main drive shaft 51. The machine may also be driven by a motor which is not shown or described herein, as it forms no part of this invention.

The machine is released for operation by depressing a clerk's key 30 (Fig. 3), a transaction key 31 or 32 (Fig. 1) and the starting bar 35 (Fig. 12). This permits the releasing shaft 48, previously mentioned, to be rocked clockwise to release the machine for operation in a manner fully illustrated and described in the above mentioned co-pending applications.

The shaft 48 normally tends to rock clockwise under the influence of a spring 285 compressed between the bottom of a slot in a link 286 and the shoulders of two identical spring pilots 287 carried by an arm 288 pinned to the shaft 48. Also pinned to the shaft 48 is an arm 289 which carries a flattened stud 290. A pawl 291 pivoted on a stud mounted in the side frame 292 of the machine normally lies in the path of the flattened stud 290, thereby holding the shaft 48 in its normal position against the pressure of the spring 285. A pin 293 carried by a slide 294, upon which is removably mounted the starting bar 35, projects into the bifurcated portion of an arm 295, connected by a link 296 to a downwardly extending arm of the pawl 291. Through this mechanism, depression of the starting bar 35 rocks the pawl 291 counter-clockwise out of the path of the stud 290 whereupon the spring 285 expands to rock the shaft 48 clockwise to release the machine.

Mechanism for restoring the shaft 48 to its normal position near the end of each operation of the machine will now be described.

Cut in the side of the gear 282 is a cam groove 300 into which projects a roller 301 carried by an arm 302, pivoted on the stud 110. At its right hand end the arm 302 is provided with a pin 303 engaging a notch 306 in an opening 304 in the link 286 previously mentioned. The cam groove 300 is shaped to rock the arm 302 clockwise and back to its normal position near the end of each cycle of operation of the machine. It will be recalled that at the beginning of the operation the arm 288 is rocked clockwise by the spring 285 which positions the stud supporting the spring pilots 287 at the upper end of the slot in the link 286. The clockwise movement of the arm 302 just described, will through the pin 303, link 286 and arm 288 rock the shaft 83 counter-clockwise slightly past its normal position whereupon the starting bar 35, pulled by a spring 305, returns to its normal position, which through mechanism hereinbefore described restores the pawl 291 to its position in the path of the stud 290. The shaft 48 then rocks clockwise until the stud 290 rests against the pawl 291, in which position the parts are ready to be released for another operation. The pawl 78 (Fig. 11) is restored in a similar manner.

As on total-taking operations the machine receives two cycles of operation, it is necessary to prevent the restoration of the parts just described to their normal positions near the end of the first cycle and mechanism provided therefor will now be described.

Referring to Figs. 12 and 13, it will be remembered that the shaft 83 is given a preliminary clockwise movement when the total lever 34 is moved to prepare the machine for a total-taking operation. This movement of the shaft 83 through the arm 112 (Fig. 12), link 111 and lever 109 moves the pitman 108 to the left a distance sufficient to remove the roller 107 thereon from the notch in which it normally rests, and into effective relation with the cam groove 105. This initial movement of the pitman also moves a coupling slide 309 to couple the cam 105 to the gear 282 in such a manner that they will be rotated in unison. A further description of the coupling slide 309 is not thought necessary, as it is old and well known in the art and shown in the Fuller patent, No. 1,242,170. At its right hand end the pitman 108 is provided with a stud 310 co-operating with a slot 311 formed in the lower end of the link 286. Upon the initial movement of the lever 34, the pitman 108 and stud 310 shift the link 286 to withdraw the notch 306 therein from the pin 303 and position a shoulder 307 into the path of the pin 303. During the first cycle of operation of a total-taking operation the cam 105 will give the pitman 108 a movement to the left, and the stud 310 will rock the link 286 clockwise and position the lower end 308 of the opening 304 therein in the path of the pin 303. In this position the restoring arm 302 is ineffective on its downward movement and will not lower the restoring link 286. During the second cycle of the machine the link 286 is restored to the position into which it was set by the total lever 34, that is, with the shoulder 307 in the path of the pin 303, and the shaft 48 is restored when the pin 303 strikes the shoulder 307 upon the downward movement of the restoring arm 302. The restoring movement given the shaft 48 at the end of a total taking operation is not as great as during adding operations since the shoulder 307 is located below the notch 306. This is necessary due to the structural relations of certain elements not disclosed herein, but which are fully disclosed in the Fuller patent referred to.

Totalizers

The machine is provided with a plurality of totalizers supported, respectively, in three frames, 315, 316 and 317, mounted on shafts 318, 319 and 320, respectively. The totalizer frames 315 and 316 are slidable laterally in the machine, to select the transaction and classification totalizers mounted thereon. The upper totalizer frame 317 carries a non-shiftable totalizer used only to accumulate the totals of multiple-item transactions and is rocked into mesh with the totalizer actuators under the control of the transaction keys in the manner fully disclosed in the patent application. To select the totalizers in the two lower frames 315 and 316, there is provided the following mechanism:

Rigidly connected to the arm 89 (Fig. 1), which it will be remembered is differentially positioned under control of the keys 31 and 32, is a segment gear 321, meshing with a rack 322 secured to a slide 323. The slide 323 is slidably mounted on two studs 324 and has a flange 325 at each end. Formed in the flanges 325 are cam slots, not shown, into which project rollers, also not shown, carried by slides 326. These slides 326 co-operate with the totalizer frames 315 and 316, to slide these frames laterally in the machine, for the purpose of selecting the totalizers, all of which is fully shown and described in previously mentioned applications.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed is:

1. The combination of a depressible key, a counter, operating means therefor, driving means for said operating means, a slidable connection between said operating means and driving means, said connection being normally ineffective to transmit movement from the driving means to the operating means for adding into the counter, and means actuated by said key for rendering said connection effective to transmit movement from the driving means to the operating means for adding into the counter.

2. The combination of a depressible key, a counter, operating means therefor, driving means for said operating means, a pin and slot connection between said operating and driving means, normally ineffective to transmit movement to the operating means for adding, and means connected to said pin and key and movable under control of said key to render said pin effective to transmit movement from the driving means to the operating means for adding into the counter.

3. The combination of a depressible key, a counter, operating means therefor, driving means for said operating means, a pin and slot connection between said operating and driving means, a pin on said key, and a link pivoted on the pin of said connection and slotted to receive the pin on the key.

4. The combination of a plurality of sets of keys, counters associated with one set of keys, individual actuating means for the counters, a common driving means for said actuating means, a connection between each key of said one set and the actuating means of its associated counter, and a selecting bar controlled by the keys of another set for rendering the actuating means of the counter associated with a depressed key of said one set effective.

5. The combination of a plurality of keys, associated counters, individual actuating means therefor, a common driving means for said actuating means, a connection between said keys and the actuating means of their associated counters, a manipulative device, and a selecting bar operated under control of said manipulative device for rendering the actuating means of counters associated with certain keys effective, and rendering the actuating means of counters associated with the other keys ineffective.

6. The combination of a key, an associated counter, actuating means therefor, a driving means for said actuating means, a connection between said key and the actuating means, means for rendering the actuating means for the counter effective, manipulative total control means, and a camming member operated under control of said manipulative total control means for rendering the driving means inactive.

7. In a machine of the class described, the combination of a depressible key, a counting device adapted to register the number of operations of said key, a driving means, and means having two positions of adjustment and when in one position cooperating with said key in depressed position to operate said counting device by the operation of said driving means.

8. In a machine of the class described, the combination of a depressible key, a counting device adapted to register the number of operations of said key, a driving means, a reciprocating device operated by said driving means, a lever having a normal position and an operated position, a movable member having two positions of adjustment, means connecting said lever with said movable member, and means engaging said movable member when in one position and said reciprocating device to operate said counting device.

9. In a machine of the class described, the combination of a plurality of depressible keys, a plurality of counting devices adapted to register the number of operations of said keys, a lever having a normal position and an operated position, actuating means for each of the counting devices, a movable member adapted when in one position to cooperate with all of said actuating means for the counting devices to register the number of operations of said keys, and means operated by said lever to move said movable member and render the actuating means more ineffective.

10. In a machine of the class described, the combination of a plurality of depressible keys, counting devices adapted to register the number of operations of each key, actuating means for each counting device, a common driving means for said actuating means, a movable member having two positions of adjustment and cooperating with all of the actuating means when in one position to enable an operation of a counting device corresponding to any of the keys, and means for shifting said movable member to render said actuating means ineffective.

11. The combination with a depressible key; and a counter; of a normally ineffective means to operate the counter; a driver to actuate the ineffective operating means; and a member pivotally connected to the operating means, and operable by the key as it is depressed, to enable the operating means to be actuated by the driver to effect an operation of the counter.

12. The combination with a depressible key; and a counter; of means to actuate the counter, including a normally disabled operating connection ineffective to transmit motion to the counter; a normally operable driver connected to the disabled operating connection; and means operable by the key upon depression, to render the connection effective to transmit motion to the counter.

13. The combination with a plurality of settable members; individual counters associated therewith; normally ineffective individual actuating means for the respective counters; means to drive the actuating means; individual connections between the respective settable members and their associated counters; and a single controlling means for the several individual actuating means, the controlling means being adjustable to positions to render all the actuating means effective or ineffective, respectively.

14. In a machine of the class described, the combination with a shiftable member; and a counter to register the number of operations thereof; of a normally effective driver; a slack counter-operating means normally ineffectively actuated by the driver; and means directly positioned by the shiftable member to enable the counter-operating means to become effective.

15. In a machine of the class described, the combination of a settable member; a counter; normally slack operating means for the counter; a driver to actuate the slack operating means; power transmitting means releasably connected to the driver; mean shiftable into and out of effective position relatively to the operating means to enable the operating means; an adjustable manipulative device; and means actuated by the adjustable device when moved to one of its positions out of normal to disconnect the power transmitting means and the driver, and when shifted to another of its positions out of normal, to maintain the connection disengaged between the power-transmitting means and the driver.

16. In a machine of the class described, the combination of a settable member; a counter; normally slack operating means for the counter; a driver to actuate the slack operating means; power transmitting means releasably connected to the driver; means shiftable into and out of effective position relatively to the operating means to enable the operating means; an adjustable manipulative device; disengaging means actuated by the manipulative device when moved to one of its positions out of normal, to disconnect the power-transmitting means and the driver; said disengaging means operable by the machine subsequently to the adjustment of the manipulative device out of normal, to re-establish the connections between the power-transmitting means and the driver.

17. In a machine of the class described, the combination of a settable member; a counter; normally ineffective operating means for the counter; a driver which ineffectively actuates the operating means; power-transmitting means releasably connected with the driver; means shiftable into and out of effective position relatively to the operating means, to render the latter effective; an adjustable device; means actuated by the adjustable device when shifted to one of its positions, to disengage the connection between the power-transmitting means and the driver; and means to automatically restore such connection.

In testimony whereof I affix my signature.

BERNIS M. SHIPLEY.